(12) United States Patent
Griggs

(10) Patent No.: US 10,797,564 B1
(45) Date of Patent: Oct. 6, 2020

(54) ABOVE GROUND ENERGY RESOURCE DEVICE THAT UTILIZES A VEHICLE'S SPINNING TIRE, AND IS MADE SERVICEABLE BY UTILIZING MAGNETS, PINS AND BRAKES

(71) Applicant: Cornelius I. Griggs, Jackson, MS (US)

(72) Inventor: Cornelius I. Griggs, Jackson, MS (US)

( * ) Notice: Subject to any disclaimer, the term of this patent is extended or adjusted under 35 U.S.C. 154(b) by 0 days.

(21) Appl. No.: 16/214,057

(22) Filed: Dec. 8, 2018

(51) Int. Cl.
*H02K 7/18* (2006.01)
*F03G 7/08* (2006.01)

(52) U.S. Cl.
CPC ............. *H02K 7/1853* (2013.01); *F03G 7/08* (2013.01)

(58) Field of Classification Search
CPC ................................. H02K 7/1853; F03G 7/08
See application file for complete search history.

(56) References Cited

U.S. PATENT DOCUMENTS

| | | | | |
|---|---|---|---|---|
| 2,984,369 A | * | 5/1961 | Johnston | B60K 25/08 414/386 |
| 3,411,346 A | * | 11/1968 | Gagliardi | G01L 5/13 73/116.06 |
| 3,557,925 A | * | 1/1971 | Zulauf | B65G 13/02 193/35 A |
| 3,859,589 A | | 1/1975 | Rush | |
| 3,885,163 A | | 5/1975 | Toberman | |
| 3,892,136 A | * | 7/1975 | MacDonald | F03G 7/08 74/14 |
| 4,239,975 A | | 12/1980 | Chiappetti | |
| 4,437,015 A | | 3/1984 | Rosenblum | |
| 5,086,857 A | * | 2/1992 | Dale | B60K 25/08 180/53.4 |
| 5,522,257 A | * | 6/1996 | D'Angelo | G01M 17/0072 73/116.06 |
| 7,279,799 B1 | * | 10/2007 | McCauley | F03G 7/08 290/1 R |
| 2004/0042852 A1 | * | 3/2004 | Alperon | E01C 9/00 404/71 |
| 2004/0130157 A1 | * | 7/2004 | Naar | B60K 7/0015 290/1 R |
| 2005/0253459 A1 | * | 11/2005 | Cole | F03G 7/08 307/10.1 |
| 2008/0164106 A1 | * | 7/2008 | Clark | B60T 13/741 188/73.31 |
| 2009/0243304 A1 | * | 10/2009 | Stein | H02K 7/1853 290/1 C |
| 2011/0298222 A1 | * | 12/2011 | Bailey | H02K 7/1853 290/1 R |
| 2016/0006319 A1 | * | 1/2016 | Fimbres | F03G 7/08 290/1 R |
| 2016/0111938 A1 | * | 4/2016 | Diaz | H02K 7/1853 |

(Continued)

*Primary Examiner* — Sean Gugger

(57) ABSTRACT

This device generates electricity when a vehicle tire rolls over a platform containing a cylindrical roller that spins. Friction causes a vehicle tire to roll the cylinder. The spinning roller drives gears of an overdrive transfer box. The output of the overdrive box is a spinning shaft. The spinning shaft turns a differential, which drives a time-gear set. The time-gear set establishes the timing of a spinning shaft from the time-gear set and drives a motor generator suitable to supply electricity to an electric utility grid.
To facilitate maintenance of the electrical generating system, brakes are utilized to hold fast the time-gear set; magnets hold fast the cylindrical roller; and a pin can lock the overdrive shaft.

6 Claims, 3 Drawing Sheets

(56) References Cited

U.S. PATENT DOCUMENTS

| | | | |
|---|---|---|---|
| 2017/0114771 A1* | 4/2017 | Lim | F03B 13/20 |
| 2019/0044413 A1* | 2/2019 | Mokoenene | F01B 23/10 |
| 2019/0242368 A1* | 8/2019 | Wang | F03G 1/06 |
| 2019/0264665 A1* | 8/2019 | Nigg | F03G 1/08 |

* cited by examiner

ABOVE GROUND ENERGY RESOURCE DEVICE THAT UTILIZES A VEHICLE'S SPINNING TIRE, AND IS MADE SERVICEABLE BY UTILIZING MAGNETS, PINS AND BRAKES

BACKGROUND—FIELD OF INVENTION

This present invention is directed to prime mover dynamo plants. More particularly, this device progresses the art of electrical generation systems. The system uses energy of a spinning tire wheel to spin a roller cylinder located in an above-ground, low profile platform housing placed on a roadway. The system transfers spinning energy through the components, generating a regulated voltage and frequency alternating current source capable of connection to an electrical power distribution grid. Several features of this design are incorporated into the system to make service and maintenance safe and friendly for a mechanic. This service task is accomplished by adding magnets, pins, and brakes to isolate various subsystems of the device.

The traditional perspective of the national electricity infrastructure is large central station power plants, each of which provides hundreds of megawatts or gigawatt levels of power. From there, high-voltage transmission power lines transport the bulk electricity over often relatively long distances to distribution grids that, then, supply customers of that electricity. The power flow tends to be one way from the central power plant, and one way from the distribution grid circuits to consumers' facilities. Historically corporations could own generation, transmission, and distribution facilities. With deregulation of electricity this ownership was separated to encourage competition. Additionally, especially in the 1990s and later, distributed, generated and clean renewable energy technologies providing electricity became more cost effective. Consumers of electricity could thus own and install distributed generators and renewable technologies. This particular generating system provides electricity utilizing the ubiquitous vehicle tire on busy streets rolling over a portable housing platform.

BACKGROUND—PRIOR ART

The art for this invention is Class 290, Prime-Mover Dynamo Plants. This class includes patents for the production and transmission of electric power.

The Expressway Power Generating System, U.S. Pat. No. 3,885,163, of Toberman, 1975, is a system that compromises a plurality of rollers installed along expressway lanes such that the rollers will be actuated by vehicles passing over them. The rollers are coupled to a network of electrical power generators so that as vehicles pass along the expressway, they cause production of useful electricity. This prior art is similar in many respects to the present system, but completely lacking novelty in the physical placement of the system in the roadway. Toberman '163 is placed 'in' the road surface. The placement of the rollers 'in' the roadway adds the complication of digging to fit the housing 'in' the road.

Additionally, once installed 'in' the roadway, '163 requires drain holes to eliminate intruding rain and drainage water. This 'in-road' installation is a cumbersome burden on road utility crews performing an installation and performing maintenance, requiring additional engineering resources and drainage features to prevent rust of the pieces and parts. This design specifically instructs that "Housing should be supplied with suitable drainage such as apertures". U.S. Pat. No. 3,885,163, Col 2 Line 6. An 'above-ground' system eliminates the problems of drainage inherent in an 'in-ground' power generating system.

The Electrical Generation Apparatus, U.S. Pat. No. 3,859,589, from Rush, 1975, is prior art that presents the same difficulty as Toberman '163. Rush, '589, is an apparatus placed in a well beneath the surface of the roadway and 'in ground'. "In-ground" means below the grade of the surface of the road and this is a place where drainage water accumulates, causing rust on the prior art pieces. Specifically, Rush '589 teaches, " . . . a housing for disposal below the ground". Additionally, Rush '589 Col 4 Line 27 claims an apparatus "for providing emergency power to a house and the like", whereas the present application presents a system that may also be utilized for the normal production of electricity using the untapped useful energy of a rotating vehicle wheel, without the issue of drainage.

U.S. Pat. No. 4,437,015, an Apparatus for Automobile Actuated Power Generation, describes the process common to the art of electrical generation using vehicular tires. "In its' simplest forms, power is taken from an auto wheel to turn the rollers and their shafts, and shaft rotation is communicated directly to an electrical generator to supply demand."

There are many other examples of attempts in this field of art. U.S. Pat. No. 4,239,975 is an Energy Producing System; Patent Application 2016/0006319, a Turbine Generator Powered by Road Embedded Roller; Patent Application 2011/0298222, an Electric Power Generation from Moving Vehicles, Patent Application 2010/0133855, a Road Vehicle Actuated Device; and Patent Application 2004/0012202 teaches a Highway Electric Roller. None are above ground. None have braking features supporting maintenance activities.

SUMMARY

Wherein a proximate function of the entire combination is the generation of electricity by a dynamo-electric machine combined with the transmission, storage, and control of the current generated for distribution on an electric utility grid. There are additional subsets of generation such as energy transfer accomplished by a cylindrical roller, a differential to direct rotational forces, a geared chain drive set to establish the timed rotation of the spinning energy, and a generator to convert torquing force at specific rotations per minute to a grid compatible current.

An additional function of the system includes storage of electricity in a battery for use as control power to operate the lift motor for neodymium magnets and electric caliper brakes.

Wherein a proximate function of the entire combination is that of an installable platform housing that utilizes vehicular traffic and, particularly, a vehicle tire in a vehicle lane in a trafficked environment, as a prime mover.

What is new and unobvious in this present invention is the dedicated components that relate directly to service and maintainability of the overall system. Magnets, pins, and brakes are utilized to slow and then stop the system to allow for subsystem isolation prior to maintenance. Neodymium magnets are used to slow and stop the rolling cylinder. Pins are used to lock shafts from the rolling cylinder to a differential. Caliper brakes are utilized on the tension belt to hold fast the shaft going to the motor generator set. Additionally, the low profile and compactness of the spinning cylinder allows for easy and quick transportability of the entire combination.

This present system, which harnesses energy from a spinning wheel and converts the energy to usable utility grade electricity for use on an electrical distribution grid, is an above ground system, designed to make service and maintenance workable for the mechanic. Magnets, pins, and brakes are incorporated into the subsystems to allow safe servicing of the dynamo plant.

ADVANTAGES

One of the novel aspects of this contraption is the usability of the device. Less than eighteen (18) feet long when stacked in a truck for delivery, and lightweight enough to be hauled by a pickup truck, this electrical generating set can be easily and quickly set in a busy, yet electrically deficient area, to provide utility power.

The platform housing and associated set is all above ground. A sub component skid, including the differential, the time-gear set, and the generator resides next to the roadway, beyond the curb. There is no need for utility crews to dig into an existing street to install this plant. The platform housing, along with the rolling cylinder, plus an ingress ramp and exit ramp, lie securely in a single lane of traffic near a curbside. From this situation, a cylindrical roller, in a low-profile platform housing, rolls on bearings; when caused to move by a rolling vehicle in traffic.

The inventor anticipates the possibility of setting up a series of such dynamo electric machines to create a 'farm' of rolling turbines that can generate electricity and connect to the electric grid.

Because the platform housing is placed in a traffic area, and because there is no need to dig to install the platform housing, a major problem of the prior art, that is the drainage of the platform housing, is eliminated; along with all of the maintenance issues caused by standing water. Prior art devices that are placed below the surface of the road develop maintenance issues because of standing water.

Although mainly intended for civil authorities of small urban centers to use as a tool to harness wasted vehicle movement energy, the machine will also find uses in any world environment where traffic is in abundance, regardless of the road surface, and usable in emergency situations. This platform housing and subcomponent skid can be easily and quickly set up in trafficked areas and used to harness a valuable electrical capacity.

What the inventor has in mind is an opportunity for urban electrical generation where a small city could reap the benefits of a smart use of city traffic. By placing the platform housing in a single lane of traffic, the vehicle wheel turns the cylinder. The cylinder turns a shaft. The shaft drives a differential unit. The differential unit drives a time-gear set. The time-gear set drives a motor generator set; and an electrical current source exists. This set is easily and quickly deployable where ever a road exists.

BRIEF DESCRIPTION OF THE DRAWINGS

The objects of this invention and other features, aspects, and advantages will become apparent to those skilled in the art with regard to the following description, appended claims, and accompanying drawings.

Figure 1:
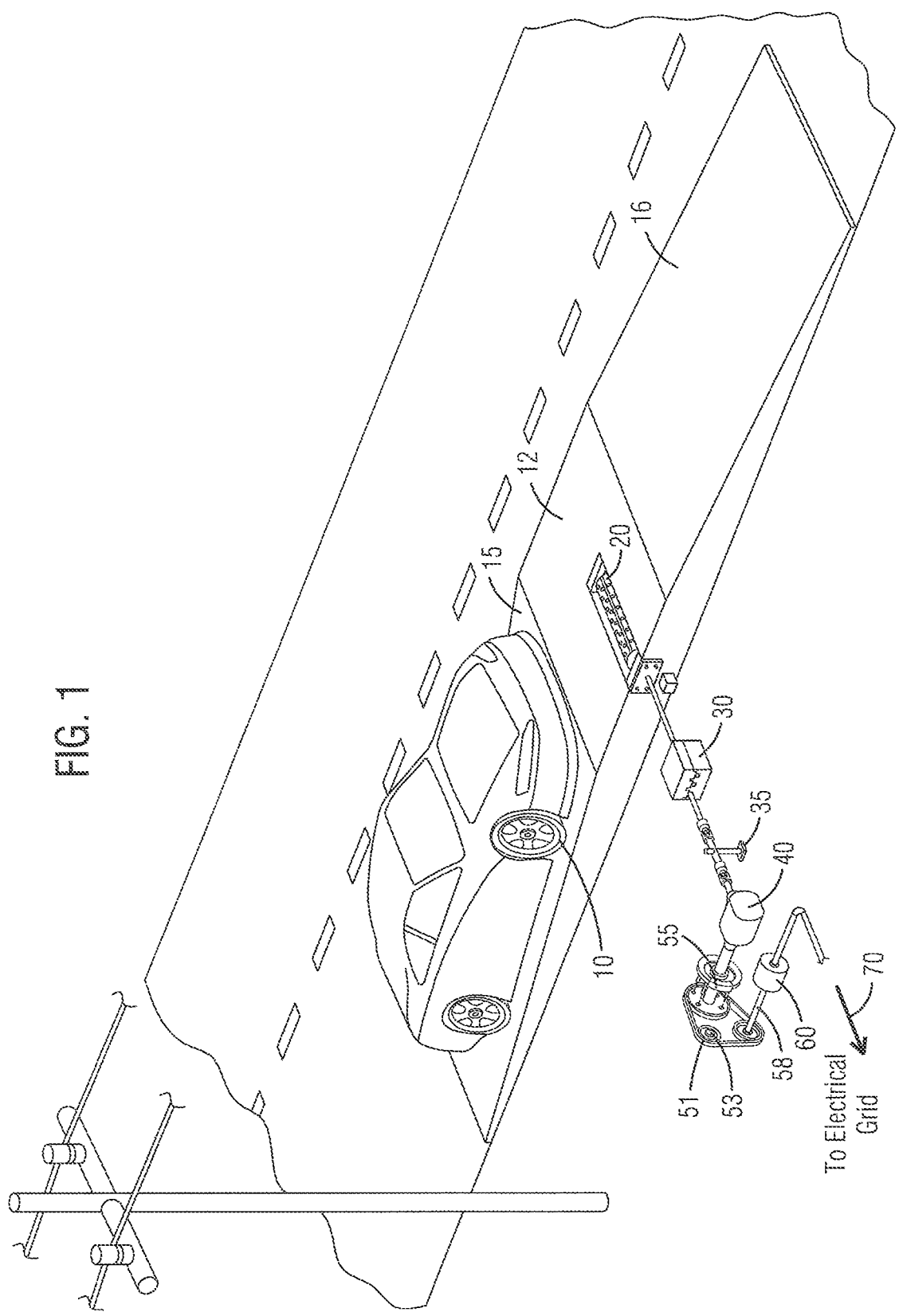
FIG. 1 is an overall perspective of a vehicle tire preparing to interact with the roller cylinder.
Figure 2:
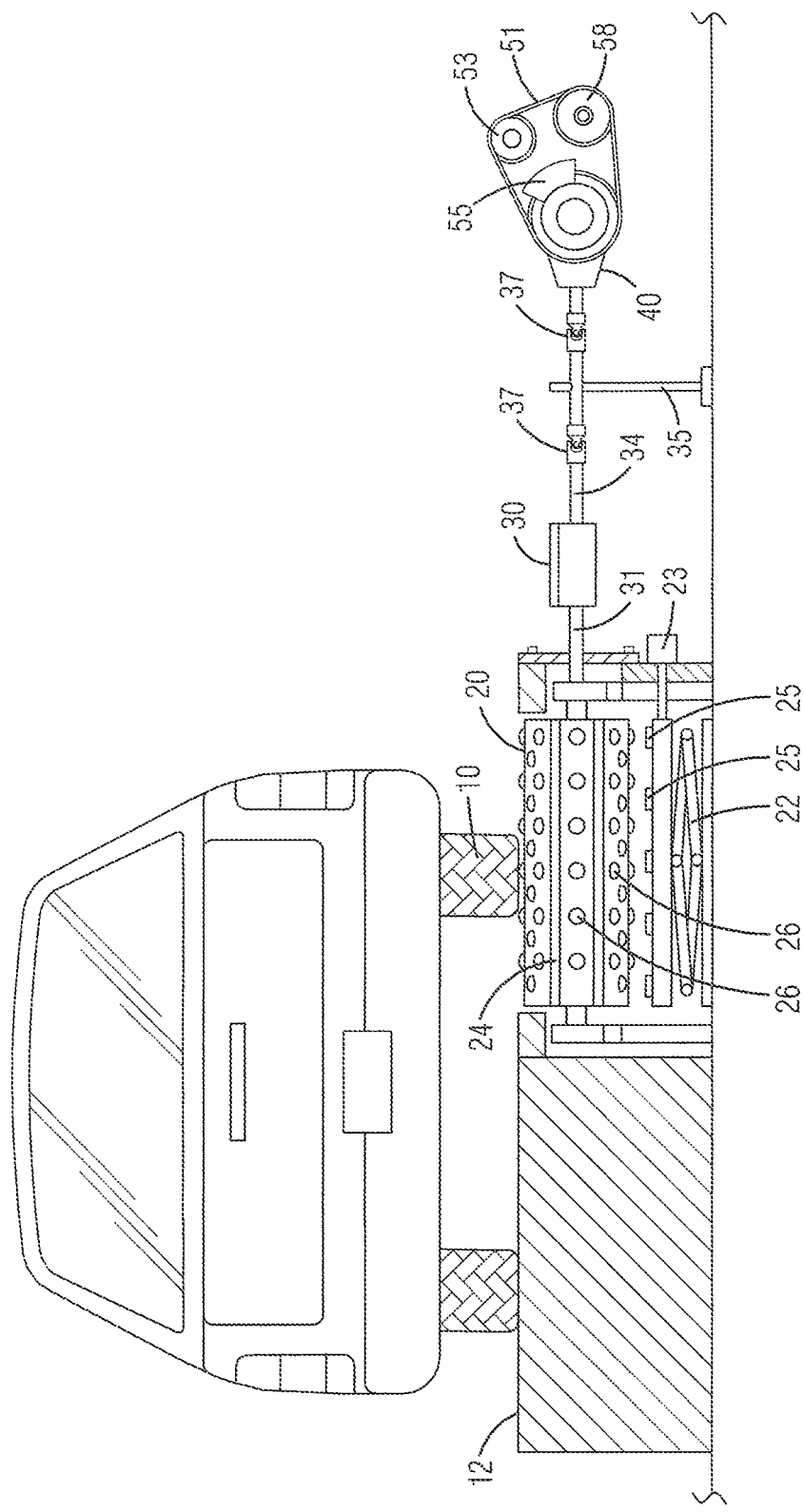
FIG. 2 is a plan view showing a vehicle tire interacting with the protrusions of the roller cylinder.
Figure 3:
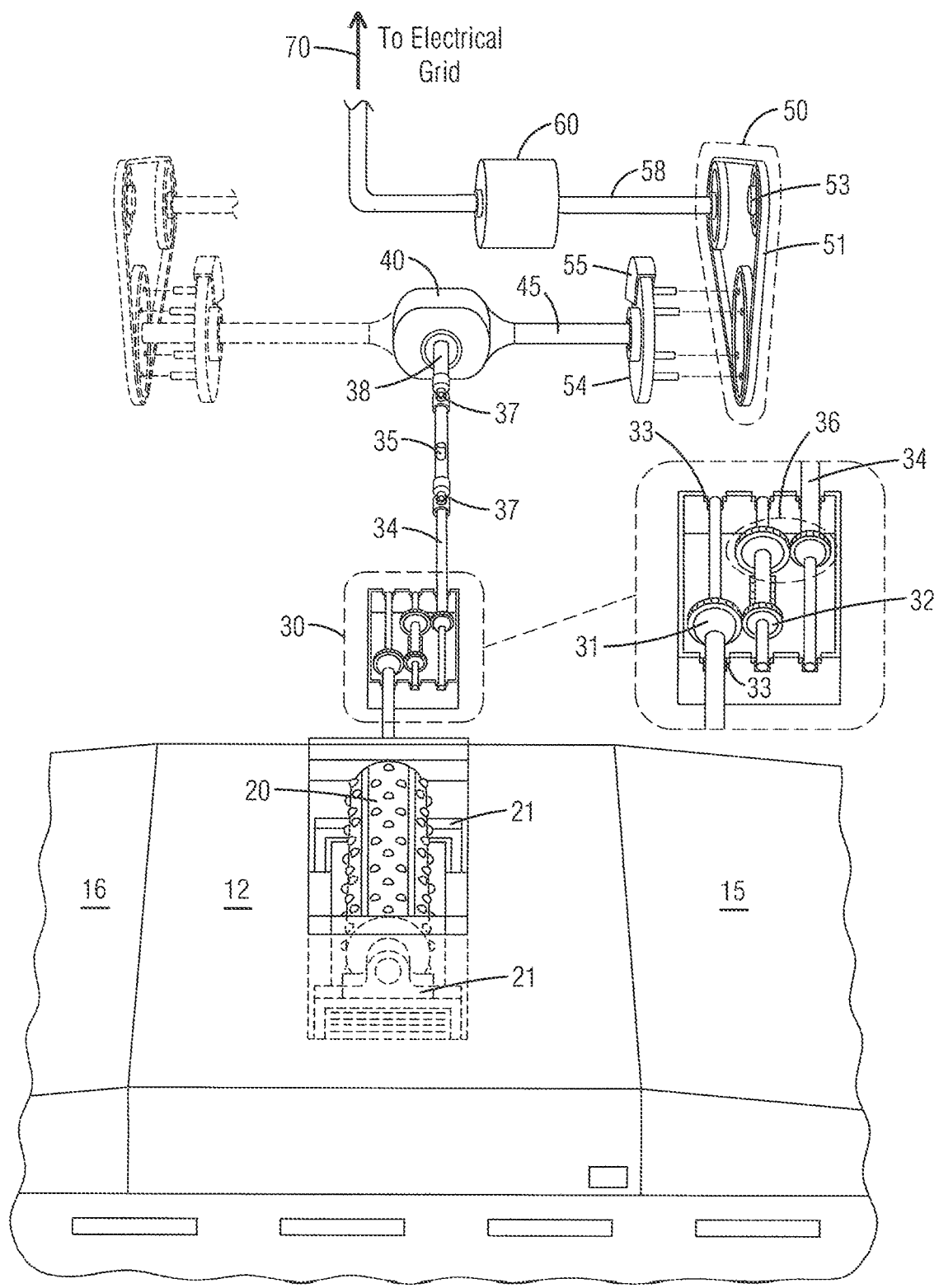
FIG. 3 demonstrates sub-components of the overall generating device.

| DRAWINGS---Reference Numerals | | | |
|---|---|---|---|
| 10 | Vehicle tire | 12 | Platform housing |
| 15 | Ingress ramp | 16 | Egress ramp |
| 20 | Roller cylinder | 21 | Bearing |
| 22 | Scissor jack | 23 | Lift Motor |
| 24 | Stop metal rod | 25 | Neodymium magnets |
| 26 | Protrusions | 30 | Overdrive transfer box |
| 31 | Drive gear | 32 | Driven gear |
| 33 | Drive gear bearing and support | 34 | Output shaft to universal joint |
| 35 | Pinning rod and base set | 36 | Gear speed increaser set |
| 37 | Universal joint | 38 | Differential input shaft |
| 40 | Differential | 45 | Constant velocity axle |
| 50 | Time-gear set | 51 | Timing belt/chain |
| 53 | Tensioner wheel | 54 | Rim |
| 55 | Caliper brake set | 58 | Output shaft to motor/generator |
| 60 | Motor generayor set | 70 | Electric output to electrical grid |

DETAILED DESCRIPTION OF EMBODIMENTS

For illustrative purposes only, the following are various embodiments of the system. At 26 miles per hour, a rotating vehicle tire 10 can spin the vehicle-driven cylindrical roller 20 1700 rotations per minute. This rotational energy is ample to provide 35.5 kilowatts of regulated electricity to an electrical distribution grid 70. This voltage and frequency regulated electricity is resource electricity for an electrical distribution grid, originating from a roller cylinder 20 in a low-profile, movable, street-mountable rectangular platform housing 12, with an ingress ramp 15 and an egress ramp 16 attached.

The process of generating electricity begins with a vehicle tire 10 rolling in a lane of a trafficked street. The vehicle tire 10 approaches a ramp that gradually leads up to a platform housing 12 positioned in a traffic lane.

An ingress ramp 15 ensures a nearly bumpless transfer from existing roadway to a housing platform 12 of low profile. Mounted inside the housing platform 12 is a roller cylinder 20. Once a vehicle tire 10 has spun the roller cylinder 20, an egress ramp 16 is provided for a nearly bumpless transfer of the vehicle tire 10 back to the roadway surface. Both the ingress ramp 15 and the egress ramp 16 are mechanically connected to the platform housing 12 with bolts. The platform housing 12 may be separated from both the ingress ramp 15 and the egress ramp 16 for ease of transport of the entire dynamo electric machine.

Platform Housing

The platform housing 12 is sized to accommodate a roller cylinder 20. The platform housing 12 is situated in one lane of a roadway. The shape of the platform housing 12 is of a flat, rectangular box. The platform housing 12 has a low profile, being high enough only to accommodate a cylindrical roller 20 and its components, and low enough for ease of access via an ingress ramp 15.

The structure of the platform housing 12 is fabricated of material able to withstand repeated vehicle traffic. Yet, the entire structure is light enough to be transportable to a new and different traffic location, if desired.

The platform housing 12 has neodymium magnets 25 mounted to interact with a stop metal rod 24 embedded in the roller cylinder 20. The neodymium magnets 25 are placed in a series on a scissor jack 22 along the underside edge of the housing platform 12 opening; close to the roller cylinder's 20 stop metal rod 24. This close distance from the roller cylinder 20 to the neodymium magnets 25 allows magnetic interaction between the neodymium magnets 25 and the stop metal rod 24 embedded in the roller cylinder 20.

The magnets 25 provide the magnetic force to attract the stop metal rod 24, and to cause slowing, and stopping of the roller cylinder 20. The scissor jack 22 is raised to slow and stop the cylinder roller 20, and lowered when not needed to slow and stop the roller cylinder 20. Control power is provided to a lift motor 23 for the scissor jack 22.

The platform housing 12 is anchored to the road by the weight of the platform housing 12 and by mounting bolts. The mounting system holds the housing platform 12 structure securely in position and prevents excessive motion of the housing platform 12.

Roller Cylinder

The roller cylinder 20 is situated inside of the housing platform 12. The housing platform 12 is situated in a trafficked lane of a roadway. The roller cylinder 20 is exposed to a vehicle tire 10 on the top portion of the roller cylinder 20 through an opening in the platform housing 12.

The exterior radius of the roller cylinder 20 is covered with protrusions 26, which are molded into the surface of a roller cylinder 20. The protrusions 26 function as raised ridges to provide a friction surface to assist in gripping a vehicle tire 10. The roller cylinder 20 is high density polyethylene in composition, cylindrical in shape, and lightweight.

Enough of the roller cylinder 20 is exposed to a rolling vehicle tire 10 to be grabbed by the friction caused by the interaction of the vehicle tire 10 surface with the roller cylinder 20. The roller cylinder 20 is not so high as to disturb the vehicle rider's comfort during the energy transfer. The roller cylinder 20 is situated in a horizontal position, parallel with a horizontal road surface, and supported on either end by a shaft on carrier bearings. The roller cylinder 20 incorporates the use of a sealed thrust bearing 21 and is geared at the curbside end.

Overdrive Transfer Box and Transfer Gears

Once the roller cylinder 20 is spinning, a drive gear 31, connected to the output shaft, rotates. The drive gear 31 turns the driven gear 32. Meshed with the driven gear 32 is a gear speed increaser set 36 that increases the rotational speed to a faster speed than the drive gear 31.

The transfer gears are the drive gear 31, the driven gear 32, and the gear speed increaser set 36. The transfer gears are located between the cylinder roller 20 and a differential 40, in an overdrive transfer box 30. The transfer gears are positioned just outside of the roller cylinder's 20 platform housing 12, and adjacent to the curbside edge of the platform housing 12. The drive gear 31 in the overdrive box 30 has a female spline to mate to the roller cylinder's 20 shafts' male end.

Output Shaft and Universal Joint

An output shaft 34, proceeding from the gear speed increaser set 36, extends out from the overdrive transfer box 30. The output shaft 34 connects to a differential input shaft 38 that proceeds to the differential 40 by way of a universal joint 37. A universal joint 37 connects the two shafts to overcome any height differential experienced by the rotational energy transfer from the output shaft 34, over any curb, and onto the differential 40.

Input Shaft to Differential

The differential input shaft 38, from the output of the universal joint 37 to the input of the differential 40, is novel in that a receptacle hole is placed in the differential input shaft 38 to receive a pin rod 35.

Differential

The differential 40 is similar in size and shape to a typical car rear end differential. A differential 40 redirects and transfers the spinning energy 90 degrees. The output of the differential 40 is a spinning constant velocity axle 45. The constant velocity axle 45 is connected to a rim 54. The rim 54 is further bolted to the time-gear set 50. The electrical generating system has the capability to utilize two (2) constant velocity axles as inputs to time-gear sets. A second time-gear set may be used as a backup to the original time-gear set. Or, in a different setup, a second constant velocity axle may be used to double the electrical capacity of the overall system by utilizing two time-gear sets and two generators.

Time-Gear Set

The time-gear set 50 receives the output of the differential 40 as a rough rotational energy, ready to be timed to the appropriate shaft rotations per minute and with a steady duty required for the motor generator 60 input. The time-gear subsystem includes a timing belt/chain 51. A tensioner wheel 53 keeps the transfer belt/chain 51 taut. The output shaft 58 to the motor generator 60 is belt/chain driven.

Generator

The motor generator set 60 is a compact device similar to a commercial 35.5 kw wind turbine generator. A rotating shaft of proper speed causes magnets to interact with a stator, generating utility grade electricity. The generator 60 is placed on a skid. The skid also includes a rechargeable battery for use as control power for the scissor jack 22, for the neodymium magnets 25, and also for caliper brake set 55 operation.

Magnet Set

A magnet set functions to slow and then to stop and hold securely, the roller cylinder 20. Neodymium magnets 25 are mounted in the platform housing 12 as individual magnets running lengthwise, and parallel to the roller cylinder 20. Opposite the neodymium magnets 25, and embedded in the roller cylinder 20, is a stop metal rod 24. The stop metal rod 24 is a steel bar. The neodymium magnets 25 are mounted to a scissor jack 22 to allow interaction with the rotating stop metal rod 24. The stop metal rod 24 is a steel rod mounted in the cylinder roller 20. The stop metal rod 24 runs the entire length of the roller cylinder 20.

Upon a signal of control power to the scissor jack 22, the neodymium magnets 25 are lifted into place which magnetically attracts the stop metal rod 24. Upon magnetic attraction, the roller cylinder 20 first slows, and then stops, and then holds fast the roller cylinder 20. The neodymium magnet 25 set is used to hold fast the roller cylinder 20 during service and maintenance work by a mechanic.

The electric neodymium magnets 25 receive control power from a storage battery. The battery is located on the sub-combination system skid. The neodymium magnet system 25 is used as secondary stop mechanism for servicing the dynamo set.

Brake

Caliper brakes 55 are used to slow, and then to stop, and then to hold fast the time-gear set 50 components for maintenance work. A caliper brake set 55 grabs a rim 54, which is attached with bolts to the main wheel of the time-gear set 50. Rim 54 receives input from the constant velocity axle 45.

The caliper brake set 55 is the primary stop mechanism. This stop feature holds fast the time-gear set 50 during maintenance by a mechanic. The secondary brake is the neodymium magnet subsystem. Coupled with the caliper brake set 55 is an emergency hand-brake mechanism which acts as a tertiary stop mechanism.

Pinning Rod

On the input shaft 38 to the differential 40, the mechanic may place a pin through the non-rotating differential input shaft 38 to lock the differential input shaft 38 in place. A pinning base is placed below the pin and resides onto of the earth's surface. This pinning rod and base set 35 allow the differential input shaft 38 to be locked in a secure, non-spinning position for maintenance activities. A hole lines up vertically with the pinning base of the pinning rod. A mechanic simply pushes a pin through both the hole and the base to create a locking mechanism.

The overall generation system is a series of structural sub-combinations. The system includes the combination of a rotating vehicular tire rolling over, and frictionally interacting with, a cylindrical structure which is further connected to a dynamo electric machine. There are several functional sub-combinations: cylinder combined with a differential to generate rotational force and then to turn that force 90 degrees; differential combined with a geared timing and transfer chain to drive a timing chain; and a geared belt/chain drive connected to an electric motor generation set to generated electricity.

CONCLUSION, RAMIFICATIONS AND SCOPE

Although the present invention has been described in considerable detail with reference to certain preferred versions thereof, other versions are possible. Therefore, the spirit and scope of the appended claims should not be limited to the description of the preferred version contained therein.

The reader's attention is directed to all papers and documents which are filed concurrently with this specification and are open to public inspection with this specification, and the contents of all such papers and documents are incorporated herein by reference. All features disclosed in this specification (including any accompanying claims, abstract, and drawings) may be replaced by alternative features serving the same, equivalent or similar purpose, unless expressly stated otherwise. Each feature disclosed is one example only of a generic series of equivalent or similar features.

While the above description contains much specificity, these should not be construed as limitations on the scope of any embodiment but as exemplifications of the presently preferred embodiments thereof. Other ramifications and variations are possible within the teachings of the various embodiments. Thus, the scope of the invention should be determined by the appended claims and their legal equivalents, not by the examples given.

What I claim is:

1. An energy production system having an energy generating apparatus, and means for driving said apparatus comprising:
an ingress ramp, a housing platform, a roller, and an exit ramp,
and said roller, which said roller is cylindrical in shape, is fitted inside said housing platform, supported by carrier bearings and knuckles in said housing platform, and in which said roller rolls when a vehicular tire interacts with a protruded surface of said roller, causing said roller to spin,
and such said spinning action of said roller causes a driven gear, attached to a shaft of said cylindrical roller, to turn and revolve,
and said driven gear turns a smaller radius receiving gear to increase the rotational speed of said receiving gear, and where both said receiving gear and said driven gear are supported and mated together in an overdrive transfer box,
and which said overdrive transfer box is provided bearings and knuckles in said overdrive transfer box as a support foundation for said driving gear and said receiving gear,
and where an output shaft is connected from said receiving gear to a universal joint, and which said universal joint is directly connected to an input shaft,
and where said input shaft is directly connected to a differential, which said differential changes the direction of the rotating energy of said cylindrical roller,
and where the output of said differential is directly connected to said driving gear of a time-gear set,
and where an output that rotates, of said time-gear set, is an input to a generator set, said generator set which has a regulated voltage output and frequency output of compatible wattage to an electrical distribution grid.

2. The device of claim 1, wherein a magnetic field is utilized to slow, and then to stop, and then to hold fast, as a brake holds fast, said cylindrical roller for service and maintenance activities.

3. The device of claim 1, wherein said input shaft to said differential has a formed structure to allow a pin to be fastened to a pin base,
and when fastened, said pin holds fast said input shaft during service and maintenance activities.

4. The device of claim 1, wherein said time-gear set utilizes an electric caliper brake set to slow, and then to stop, and then to hold fast said time-gear set during service and maintenance activities.

5. The device of claim 1, wherein said time-gear set utilizes a tensioner wheel to hold taut a belt/chain.

6. The device of claim 1, wherein battery storage is utilized to provide control power to activate a lift motor for neodymium magnets, and to an electric caliper brake set.

\* \* \* \* \*